US009102047B2

(12) United States Patent
Park

(10) Patent No.: US 9,102,047 B2
(45) Date of Patent: Aug. 11, 2015

(54) ADJUSTABLE LENGTH ADAPTER AND MULTI-DEVICE WITH THE SAME

(76) Inventor: Sung Chul Park, Pyeongtaek-si (KR)

( * ) Notice: Subject to any disclaimer, the term of this patent is extended or adjusted under 35 U.S.C. 154(b) by 608 days.

(21) Appl. No.: 13/501,072

(22) PCT Filed: Mar. 8, 2010

(86) PCT No.: PCT/KR2010/001443
§ 371 (c)(1),
(2), (4) Date: Apr. 9, 2012

(87) PCT Pub. No.: WO2011/043518
PCT Pub. Date: Apr. 14, 2011

(65) Prior Publication Data

US 2012/0193880 A1 Aug. 2, 2012

(30) Foreign Application Priority Data

Oct. 8, 2009 (KR) ........................ 10-2009-0095494

(51) Int. Cl.
*F16D 43/16* (2006.01)
*F16D 43/18* (2006.01)
*B25F 1/02* (2006.01)
*B25B 3/00* (2006.01)
*B25F 3/00* (2006.01)

(52) U.S. Cl.
CPC ............. *B25F 3/00* (2013.01); *Y10T 279/3418* (2015.01)

(58) Field of Classification Search
CPC ................ B25F 1/02; B25F 3/00; B25F 5/00; B23B 31/10; B23B 13/46; F16D 43/16; F16D 43/18
USPC ......... 173/42, 44, 190, 192, 196, 29, 39, 104, 173/178; 279/145; 192/105 BA, 105 BB; 81/64, 65, 65.2, 68, 69, 70, 65.4
See application file for complete search history.

(56) References Cited

U.S. PATENT DOCUMENTS 4,891,915 A 1/1990 Yasuda
5,072,633 A 12/1991 Smith
5,461,949 A 10/1995 Carver
6,453,778 B1 * 9/2002 Long ............................ 81/57.13

FOREIGN PATENT DOCUMENTS

JP 57-43651 9/1982
JP 6-651 1/1994

(Continued)

OTHER PUBLICATIONS

International Search Report for PCT/KR2010/001443 mailed Oct. 28, 2010.

*Primary Examiner* — Thanh Truong
*Assistant Examiner* — Praachi M Pathak
(74) *Attorney, Agent, or Firm* — Andrus Intellectual Property Law, LLP

(57) ABSTRACT

An adjustable length adapter incorporates a driving motor on the inside and is coupled with a rotation tool at one side, wherein a rotation shaft protrudes from the rotation tool and rotates when the driving motor is driven. The adapter includes a coupling member formed with a through-hole at one side to be penetrated by the rotation shaft, wherein the rotation tool is coupled at one side of the rotation tool, a main body having a supporting member formed at the other side of the coupling member, a varying section having one side coupled with the supporting member and withdrawable therefrom, and the other side is formed with a rotation shaft to be coupled with an exchangeable working member, a driving pulley disposed on top of the main body and coupled with the rotation shaft, a driven pulley coupled with the rotation shaft of the varying section, and a belt coupled between the driving pulley and the driven pulley for rotating the driven pulley when the rotation shaft protruded from the rotation tool rotates. The main body of the adapter coupled at a side of the rotation tool is coupled with a varying section, which is coupled with a working member such as a cutting blade or the like, in such a manner that the length of the varying section is adjustable so that the length is adjusted according to the state of an object, thereby enabling easy machining of the object.

13 Claims, 4 Drawing Sheets

(56) References Cited

FOREIGN PATENT DOCUMENTS

| | | |
|---|---|---|
| JP | 11-207647 | 8/1999 |
| JP | 3147550 | 12/2008 |
| KR | 20-1993-0003440 | 6/1993 |
| KR | 20-2009-0009257 | 9/2009 |
| KR | 2020090009257 | 9/2009 |

* cited by examiner

ADJUSTABLE LENGTH ADAPTER AND MULTI-DEVICE WITH THE SAME

RELATED APPLICATIONS

This application is a 371 application of International Application No. PCT/KR2010/001443, filed Mar. 8, 2010, which in turn claims priority from Korean Patent Application No. 10-2009-0095494, filed Oct. 8, 2009, each of which is incorporated herein by reference in its entirety.

TECHNICAL FIELD

The present invention relates to a multi-device using a turning tool, and in particular to a multi-device using an adaptor which is length-adjustably coupled to a turning tool.

BACKGROUND ART

A turning tool with a motor built-in therein generally is used by directly coupling a cutting blade or something to a rotary shaft.

In the event that a work piece is larger than a turning tool or is outwardly protruded, a work is easy; however in the event that a work piece is smaller than a turning tool or has an inwardly contracted configuration, work is not easy to do.

DISCLOSURE OF INVENTION

Accordingly, a adjustable length adaptor according to the present invention is directed to working out the following problems.

It is a first object of the present invention to provide an adaptor which can easily process a work piece which has an inwardly contracted configuration or is smaller than a turning tool.

It is a second object of the present invention to provide an adaptor the length of which can be extended or shortened in a desired length.

It is a third object of the present invention to provide an adaptor which makes it possible to stably couple a varying part to which a cutting blade or something is coupled during work, thus preventing a safety accident.

It is a fourth object of the present invention to provide an adaptor which can be adjusted depending on a tensional force of a varying belt in the event that a tensional force of a belt coupled to rotate a cutting blade or something varies.

The above technical solutions are not limited thereto, and it is obvious that other technical solutions not mentioned above can be clearly understood to an ordinary person skilled in the art.

To achieve the above objects, there is preferably provided a adjustable length adaptor with a driving motor built-in therein, with the adaptor being length-adjustable and being coupled to a turning tool at its one side wherein a turning tool rotating when a driving motor is driven is protruded from the turning tool.

There is preferably provided an adaptor according to the present invention which comprises a body part formed of a coupling member coupled to one side and has a through hole for the rotary shaft of the turning tool to pass through and is coupled to one side of the turning tool, and a support member which is formed at the other side of the coupling member.

It is preferred that an adaptor according to the present invention comprises a varying part one side of which can be withdrawn from a support member, with a rotary shaft engaged with an exchangeable work piece being coupled to the other side.

It is preferred that an adaptor according to the present invention comprises a driving pulley disposed on the top of a body part and coupled to a rotary shaft of a turning tool, and a driven pulley coupled to a rotary shaft of a varying part.

It is preferred that an adaptor according to the present invention comprises a belt which is connected between a driving pulley and a driven pulley, thus rotating a driven pulley when a rotary shaft protruded from a turning tool rotates.

It is preferred that an adaptor according to the present invention comprises a support member with an insertion channel formed at its one side in a concave shape.

It is preferred that an insertion rod is formed at a support member of an adaptor in a shape corresponding to the shape of an insertion channel and is coupled to be withdrawn from an insertion hole.

It is preferred that an engaging hole communicating with an insertion hole is formed at a support member of an adaptor and is coupled with a fixture, and a plurality of engaging grooves are formed at one side surface of an insertion rod, with the end portions of a fixture engaged to an engaging hole being inserted into the engaging grooves, respectively.

It is preferred that pluralities and insertion channels and engaging holes are formed at a support member which belongs to an adaptor of the present invention.

It is preferred that a first handle engaging part is formed at one side of an engaging member which belongs to an adaptor, and a second handle engaging member is formed at one side of a support member, thus allowing a handle to selectively couple with a first handle engaging member and a second handle engaging member.

It is preferred that a protection cover is detachably coupled to one side of a varying part which belongs to an adaptor, thus preventing a work piece from flying during the rotation of a work piece.

It is preferred that a handle coupled to a second handle engaging part which belongs to an adaptor of the present invention is installed in parallel at a rotary shaft of a varying part.

It is preferred that a safety cover is formed at one side of an engaging member which belongs to an adaptor of the present invention, thus preventing a belt coupled to a driving pulley from being exposed to the outside.

It is preferred that a protruded part preventing a slipperiness of a belt during the rotation of a driving pulley is formed at a surface coming into contact with the belt of a driving pulley an a driven pulley which belong to an adaptor of the present invention, and a plurality of protrusions inserted into the protrusions are formed at the belt.

It is preferred that either a driving pulley or a driven pullet which belongs to an adaptor of the present invention includes a hub, a first belt contact member, a second belt contact member, an elastic member, a cover member, and a tensional force adjusting member.

It is preferred that an adaptor of the present invention comprises a circular plate shaped hub with an engaging shaft disposed at its upper surface.

It is preferred that an adaptor of the present invention comprises a first belt contact member which is coupled to an upper surface of a hub at a certain interval.

It is preferred that an adaptor of the present invention comprises a second belt contact member which is disposed at an interval from an engaging shaft and is slidable between the engaging shaft and the first belt contact member.

It is preferred that an adaptor of the present invention comprises an elastic member engaged between a second belt contact member and a hub.

It is preferred that a tensional force adjusting member which is coupled to an upper side of a first belt contact member and pressurizes a second belt contact member as it is engaged to a ring shaped cover member and an engaging shaft, respectively.

It is preferred that a longitudinal hole is formed at a hub coming into contact with a second belt contact member which belongs to an adaptor of the present invention.

It is preferred that one side of an elastic member belonging to an adaptor of the present invention is coupled to a lower central portion of a hub, and the other side of the elastic member passes through a longitudinal hole and is coupled to a lower side of a second belt contact member, and a protruded guide member inserted into the longitudinal hole is formed at a lower side of the second belt contact member.

It is preferred that a work piece belonging to an adaptor of the present invention is one among a lumber cutter, a stone cutter, a steel cutter, a cleaning brush and a gloss brush.

It is preferred that a multi-device with an adaptor of the present invention comprises a turning tool with a driving motor built-in therein, with a protruded rotary shaft rotating during the operation of a driving motor being disposed at one side of the same.

It is preferred that a multi-device comprises an engaging member which has a though hole formed at one side to allow a rotary shaft of a turning tool to pass through the same, and is coupled to one side of the turning tool.

It is preferred that a multi-device comprises a body part including a support member formed at the other side of an engaging member.

It is preferred that a multi-device comprises a varying part one side of which is engaged at a support member in such a way to be withdrawn from the same, with a rotary shaft engaged with an exchangeable work piece being engaged at the other side of the same.

It is preferred that a multi-device comprises a driving pulley disposed on the top of a body part and coupled to a rotary shaft of a turning tool, and a driven pulley coupled to a rotary shaft of a varying part.

It is preferred that a multi-device comprises a belt connected between a driving pulley and a driven pulley, thus rotating a driven pulley as a rotary shaft protruded from a turning tool rotates.

Advantageous Effects

The adjustable length adaptor according to the preset invention is advantageously characterized in that a varying part to which a tool such as a cutting blade or something is coupled is length-adjustably coupled to a body part coupled to one side of a turning tool, thus easily processing a work piece while adjusting the length depending on the state of a work piece.

An engaging groove is formed at a varying part which is length-adjustably coupled to the body part, and a fixture to be inserted into the engaging groove is installed at the body part, thus stably fixing the varying part.

In addition, the diameter of the driving pulley or the driven pulley can be variable, so when the tensional force of the connected belt varies, the diameter of the driving pulley or the driven pulley can be adjusted depending on the tensional force of the varying belt.

The advantageous effects of the present invention are not limited thereto; and it is obvious to an ordinary person in the skill that other effects not mentioned can be easily understandable through the following descriptions.

BRIEF DESCRIPTION OF THE DRAWINGS

The present invention will become better understood with reference to the accompanying drawings which are given only by way of illustration and thus are not limitative of the present invention, wherein.

BEST MODES FOR CARRYING OUT THE INVENTION

The adjustable length adaptor coupled to a turning tool which is formed of a built-in driving motor in its interior and from which a rotary shaft rotating during a driving of the driving motor is protrude from its one side, comprises a body part which has, at its one side, a through hole allowing a rotary shaft of the turning tool to pass through, and further has an engaging member coupled to one side of the turning tool and a support member formed at the other side of the engaging member; a varying part which has one side coupled to the support member in a withdrawing-possible way, with a rotary shaft to which an exchangeable work member is coupled, being formed at its other side; a driving pulley which is disposed on the top of the body part and is coupled to the rotary shaft of the turning tool; a driven pulley which is coupled to the rotary shaft of the varying part; and a belt which is connected between the driving pulley and the driven pulley and rotates the driven pulley during the rotation of the rotary shaft protruded from the turning tool.

Modes for Carrying Out the Invention

The adjustable length adaptor and multi-device with the same according to the present invention will be described in details with reference to the accompanying drawings.

Figure 1:
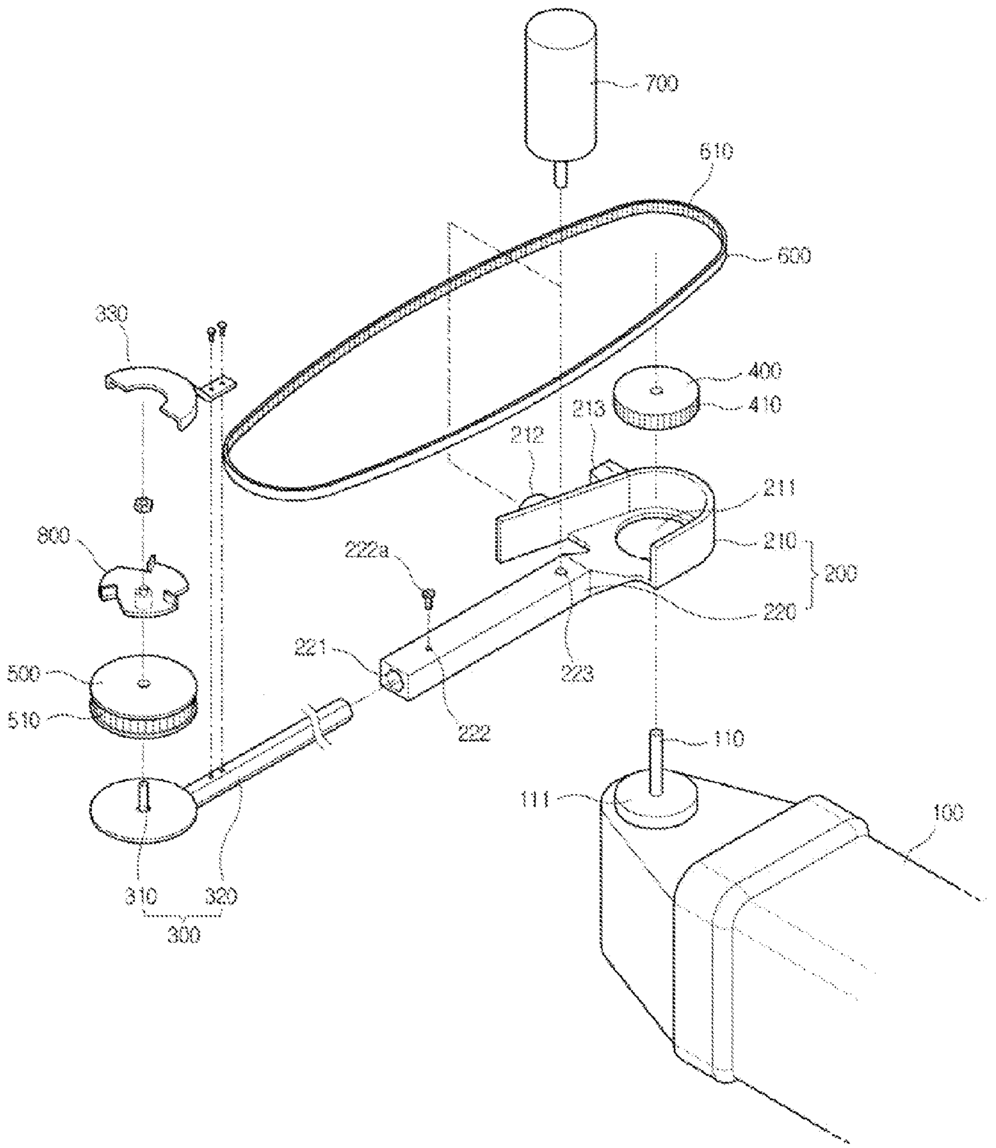
FIG. 1 is a disassembled perspective view illustrating a adjustable length adaptor according to an embodiment of the present invention.

FIG. 1 is a disassembled perspective view illustrating a adjustable length adaptor according to the present invention.

As shown in FIG. 1, the adaptor according to the present invention is coupled to a turning tool which has a driving motor therein, with a rotary shaft 110 being protruded from the turning tool 100 and rotating during the operation of the driving motor at one side and comprises a body part 200, a varying part 300, a driving pulley 400, a driven pulley 500 and a belt 600.

The body part 200 comprises, at its one side, a through hole 211 allowing the rotary shaft 110 of the turning tool 100 to pass through the same, and with the aid of the above construction further comprises an engaging member 210 coupled to one side of the turning tool, and a support member 220 formed at the other side of the engaging member 210.

The varying part 300 has one side which is coupled to the support member 220 in a withdrawing-possible way, with the rotary shaft 310 coupled with an exchangeable work piece being formed at the other side.

The driving pulley 400 is disposed at the top of the body part 200, and is coupled to the rotary shaft 110 of the turning tool 100.

The driven pulley 500 is coupled to the rotary shaft 310 of the varying part 300.

The belt 600 is connected between the driving pulley 400 and the driven pulley 500, thus rotating the driven pulley 500 when the rotary shaft 110 protruded from the turning tool 100 rotates.

The turning tool 100 has, at its one side, a rotary shaft 110 rotating by means of the driving motor.

The turning tool 100 might be formed of a cutting tool such as a grinder, a circular driven saw or something, and a drilling machine such as a drill or something; however in the present invention the grinder among the turning tools will be described as a representative for better understanding of the present invention.

The body part 200 is coupled to the turning tool and supports the varying part 300.

The body part 200 is formed of an engaging member 210 and an extension member 220.

The engaging member 210 has, at its one side, a through hole 211 allowing the rotary shaft 110 of the turning tool 100 to pass and is consequently coupled to the turning tool 100, and the extension member 220 is formed at the other side of the engaging member 210.

The engaging part 213 is formed at a side surface of the through hole 211 and is coupled to the rotation part 111 of the turning tool 100 with the rotary shaft 110.

The support member 220 is to be coupled with the varying part 300 and is extended from the other side of the body part 200.

The varying part 300 is coupled in such a way to be withdrawn from the other side of the support member 220.

At one side of the varying part 300 is formed an insertion rod 320 which is coupled to the support member 220 in a withdrawing-possible way, with the rotary shaft 320 being disposed at the other side.

As shown in FIG. 1, the driving pulley 400 is coupled to the rotary shaft 110 of the turning tool 100, and the driven pulley 500 is coupled to the rotary shaft 310 of the varying part 300.

The belt 600 is connected between the driving pulley 400 and the driven pulley 500. So, the belt 600 serves to transfer the rotational force from the rotary shaft 110 of the turning tool 100 to the driven pulley 500 as the driving motor of the turning tool 100 is driven.

A work member 800 formed of a lumber cutter, a stone cutter, a steel cutter, a cleaning brush or a gloss brush is secured to the rotary shaft 310 to which the driven pulley 500 is connected.

So, as the rotary shaft 310 of the varying part 300 rotates together with the driven pulley 500 as the driven pulley 500 rotates, so the work member 800 secured to the rotary shaft 310 starts rotating.

As shown in FIG. 1, a protection cover 330 is detachably installed at one side of the varying part 300, thus preventing a work piece from flying during the rotation of the work member 800.

Here, the protection cover 330 serves to prevent the pieces cut off the work piece from flying toward a user during a processing work of lumber, stone or steel.

As shown in FIG. 1, the protection cover 330 can be detachably coupled at one side surface of the insertion rod 320 by means of a fixture. In addition, the protection cover 330 might be detachably installed at a lower or lateral side of a portion where the rotary shaft 310 of the varying part 300 is installed.

In the present embodiment of the present invention, the protection cover 330 is formed in a semi-circular shape; however its configuration is not limited thereto, namely, the protection cover 330 might be formed in a certain shape as long as it can prevent flying of a work piece during the rotation of the work member 800.

The varying part and the support member will be described in more details with reference to FIG. 2.

Figure 2:
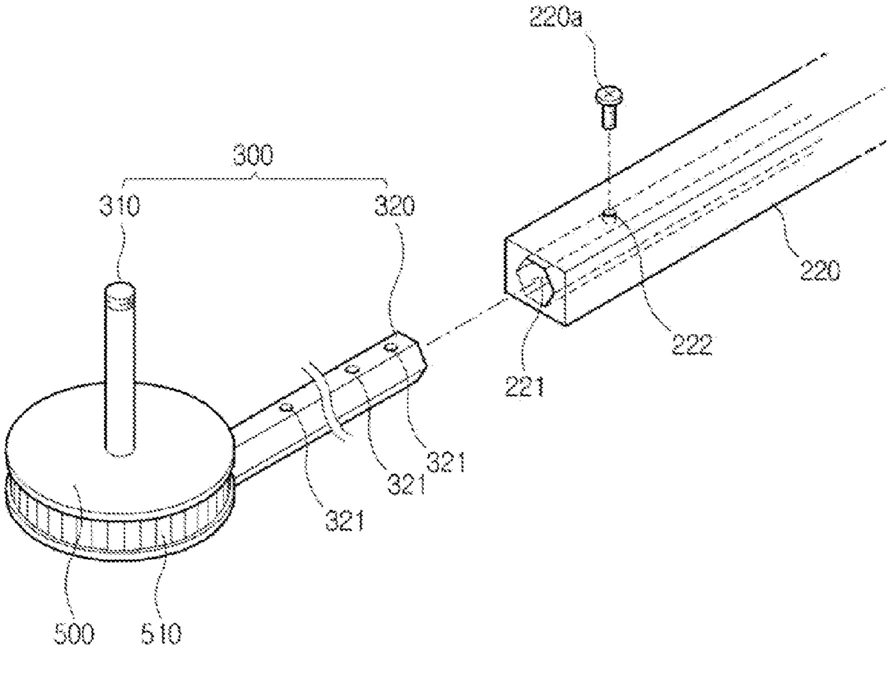
FIG. 2 is an enlarged perspective view illustrating a varying part and a support member of a adjustable length adaptor according to an embodiment of the present invention.

As shown in FIG. 2, an insertion channel 221 is formed at one side of the support member 220 in a concave shape.

An insertion rod 320 is formed at one side of the varying part 300 in a certain shape matching with the shape of the insertion channel 221 and is coupled to the insertion channel 221 in a withdrawing-possible way.

The insertion channel 221 serves to allow the insertion rod 320 to be inserted into the same and is formed inwardly from one side of the support member 220.

As shown in FIG. 2, the insertion channel 221 has a circular cross section, however might have a polygonal cross section.

When the insertion channel 221 with a circular cross section is formed, the insertion rod 320 formed at the insertion channel 221 is formed in a cylindrical column shape, and when the insertion channel 221 has a polygonal cross section, the insertion rod 320 formed at the insertion channel 221 has a polygonal cross section.

When the insertion channel 221 has a circular cross section, the insertion rod 320 designed to be inserted into the insertion channel 221 might be inserted into the insertion channel 221 and can rotate in the interior of the insertion channel 221. For this reason, it is preferred that the insertion channel 221 and the insertion rod 320 are made to have polygonal cross sections.

An engaging hole 222 communicating with the insertion channel 221 might be formed at the support member 220, thus allowing the fixture 222*a* to be engaged. Here, a plurality of engaging grooves 321 might be formed at one side surface of the insertion rod 320, thus allowing the end portion of the fixture 222*a* coupled to the engaging hole 222 to be inserted into the same.

Here, the fixture 222*a* is directed to preventing the insertion rod 320 from escaping from the insertion channel 221 during work, and as shown in FIG. 2, it is formed at an upper surface of the support member 220 and is coupled to the engaging hole 222 communicating with the insertion channel 221.

As shown in FIG. 2, the engaging hole 222 might be formed at an upper surface of the support member 220. An engaging hole 222 might be provided in multiple numbers to more stably fit the insertion rod 320 to the support member 220.

An engaging groove 321 is formed at one side surface of the insertion rod 320, thus allowing an end portion of the fixture 222*a* coupled to the engaging hole 222 to be inserted into the same.

As shown in FIG. 2, the engaging groove 321 is provided in multiple numbers at the insertion rod 320 at intervals. So, when the insertion rod 320 is inserted into the insertion channel 221, it is possible to select the position of the engaging groove 321 into which the fixture 222*a* is inserted, thus adjusting the length of the insertion rod 320.

As shown in FIG. 2, one insertion channel 221 into which the insertion rod 320 is inserted can be formed solely at the support member 220, and a plurality of insertion channels 221 might be installed at the support member 220.

When the insertion channels 221 are provided in multiple numbers, it is possible to advantageously change the position where the insertion rod 320 is installed. Even when one among the multiple insertion channels 221 gets damaged, it is possible to install the insertion rod 320 by changing the position of the insertion channel 221.

As shown in FIG. 1, the adaptor according to the present invention is characterized in that a first handle engaging member 212 to which the handle 700 is engaged is formed at one side of the engaging member 210.

A second handle engaging member 223 is formed at one side of the support member 220, thus selectively securing the handle 700 to the first handle engaging member 212 or the second handle engaging member 223.

The first handle engaging member 212 and the second handle engaging member 223 allow the user to work while changing the handles depending on the work condition where the user works using a adjustable length adaptor.

In the event that the handle 700 secured to the second handle engaging member 223 among the handle engaging members is installed in parallel with the rotary shaft 310 of the varying part 300, it is advantageous for a user to work with the work member facing a central portion of a user's body while holding the turning tool with one hand.

It is preferred that the second handle engaging member 223 is formed in such a way that the handle engaged is in parallel with the rotary shaft of the varying part 300.

As shown in FIG. 1, a safety cover 213 is formed at one side of the engaging member 210 in such a way to prevent the belt connected to the driving pulley 400 from being exposed to the outside.

The safety cover 213 is basically directed to preventing safety accidents which might occur as the belt 600 connected between the driving pulley 400 and the driven pulley 500 is exposed in the direction of the user. It is preferred that the safety cover 213 is formed in a C-shape corresponding to part of the shape of the driving pulley 400 coupled to the rotary shaft 110 of the turning tool 100.

A plurality of protrusions 610 might be formed at an inner surface of the belt 600 at intervals according to the present invention, and the protrusions 410 and 510 into which the protrusions 610 are inserted are formed at the surface coming into contact with the belt 600 of the driving pulley 400 and the driven pulley 500.

Figure 3:
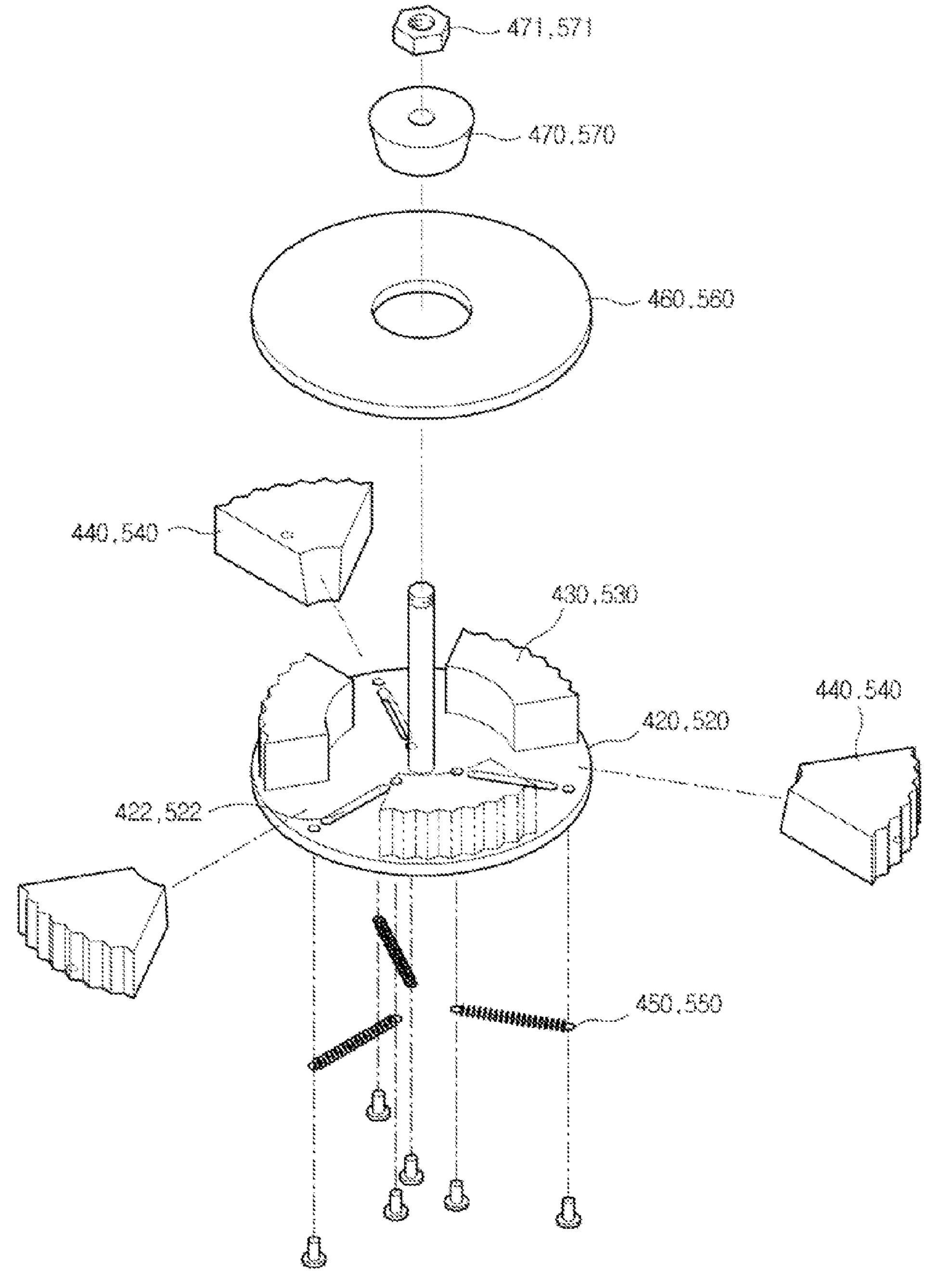
FIG. 3 is a disassembled perspective view illustrating a driving pulley an a driven pulley according to an embodiment of the present invention.

FIG. 3 is a disassembled perspective view illustrating a driving pulley 400 and a driven pulley 500 which are adapted to a adjustable length adaptor according to an embodiment of the present invention, and the same reference numerals of the same elements are together recited in FIG. 3 to avoid repeated descriptions.

The pulley of FIG. 3 will be described with reference to the driving pulley 400. The driving pulley 400 is formed of a hub 420, first belt contact members 430 and 530, second belt contact members 440 and 540, elastic members 450 and 550, cover members 460 and 560 and tensional force adjusting members 460 and 560.

Here the hub 420 is formed in a circular plate shape, with an engaging shaft 421 being formed at the upper surface of the same, thus allowing the hub 420 to be engaged to the rotary shaft 110 of the turning tool.

The first belt contact members 430 and 530 are engaged to the upper surface of the hub 420 at intervals.

The second belt contact members 440 and 540 are spaced apart from the engaging shafts 421 and 521 and are slidably disposed between the first belt contact members 430 and 530.

The elastic members 450 and 550 are engaged between the second belt contact members 440 and 540 and the hubs 420 and 520.

The tensional force adjusting members 460 and 560 are engaged to the tops of the first belt contact members 430 and 530 and are coupled to the ring shaped cover members 460 and 560 and the engaging shafts 421 and 521, thus pressurizing the second belt contact members 440 and 540.

Figure 4:
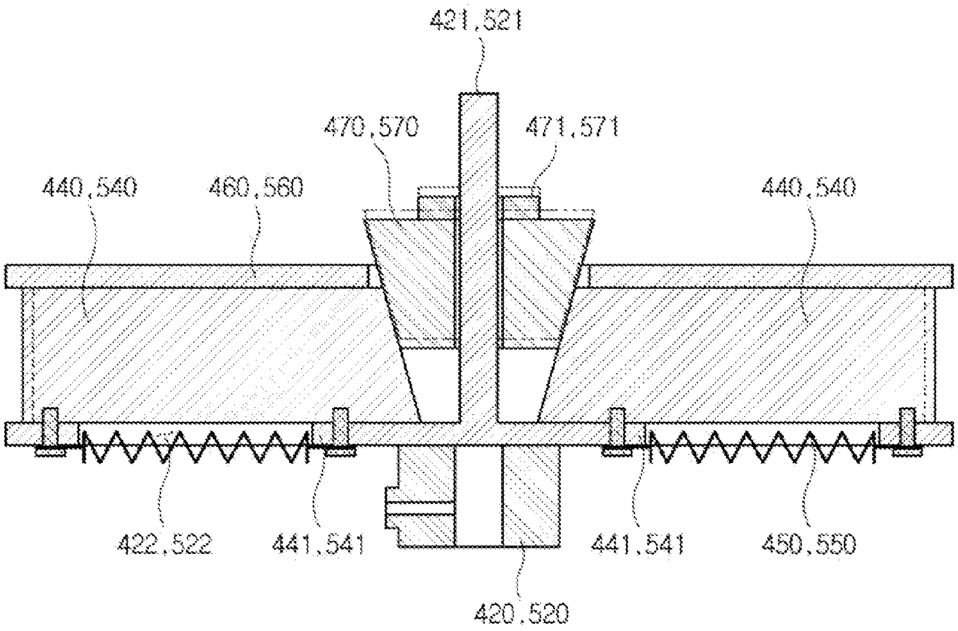
FIG. 4 is a cross sectional view illustrating a driving pulley ad a driven pulley of FIG. 3.

The hub 420 is coupled to the rotary shaft and is formed in a circular plate shape as shown in FIG. 4 showing the cross section of FIG. 3. A cylindrical fixing member is formed at a lower side of the hub 420 for an engagement to the rotary shaft.

As shown in FIG. 3, an engaging shaft 421 is formed at a central portion of an upper surface of the hub 420, and the first belt contact member 430 and the second belt contact member 440 are disposed around the engaging shaft 421 at intervals.

The first belt contact member 430 and the second belt contact member 440 come into contact with the belt 600, respectively, and the first belt contact member 430 and the second belt contact member 440 are formed in a shape like part of a ring shape is cut away.

The first belt contact member 430 between the first belt contact member 430 and the second belt contact member 440 is fixed at the upper surface of the hub 420, and the second belt contact member 440 is movably engaged at the upper surface of the hub 420.

The surface facing the engaging shaft 421 of the second belt contact member 440, as shown in FIG. 4, has a certain inclination angle toward the lower side of the hub 420. At this time, the elastic member 450 is engaged between the hub 420 and the second belt contact member 440.

The cover member 460 is coupled to the upper surface of the first belt contact member 440 in a circular shape, and the engaging shaft 421 is protruded from an upper, central portion of the cover member 460.

The tensional force adjusting member 470 coming into contact with the second belt contact member 440 is engaged to the engaging shaft 421 protruded from an upper, central portion of the cover member 460.

So, the second belt contact member 440 pressurizes the second belt contact member 440 and moves toward the outside of the engaging shaft 421 in the event that the tensional force adjusting member 470 is coupled to a lower side of the engaging shaft 421.

On the contrary, in the event that the tensional force adjusting member 470 is coupled to an upper side of the engaging shaft 421, the second belt contact member 440 moves in the direction of the engaging shaft 421 by means of the elastic member 450.

As the second belt contact member 440 moves, the surface of the driving pulley 400 coming into contact with the belt 600 increases or decreases. So, the tensional force of the belt 600 connected between the driving pulley 400 and the driven pulley 500 can be adjusted depending on the moving direction and the position of the second belt contact member 440.

As shown in FIG. 3, a longitudinal hole 422 coming into contact with the second belt contact member 440 is formed at the hub 420. Here, one side of the elastic member 450 is coupled to a lower, central portion of the hub 420, and the other side of the elastic member 450 is coupled to a lower side of the second belt contact member 440 through the longitudinal holes 422 and 522.

A protruded guide member 441 to be inserted into the longitudinal hole 422 is coupled to a lower side of the second belt contact member 440.

As shown in FIG. 3, the driven pulley 500 coupled to the varying part 300 comprises a hub 520, a first belt contact member 530, a second belt contact member 540, an elastic member 550, a cover member 560 and a tensional force adjusting member 570.

The construction of the driven pulley 500 is the same as the construction of the driving pulley 400, so the descriptions thereon will be omitted.

The adaptor according to the present invention might be embodied separately from the turning tool with the driving motor built in therein or can be embodied together with the turning tool 100.

When it embodied together with the turning tool 100, the multi-device with a adjustable length adaptor comprises a turning tool 100, a body part 200, a varying part 300, a driving pulley 400, a driven pulley 500 and a belt 600.

The turning tool 100 has a built-in driving motor in its interior, with a rotary shaft 110 being protruded from its one side and rotating during the driving of the driving motor.

The body part 200 is formed of an engaging member 210 and a support member 220.

The engaging member 210 has, at its one side, a through hole 211 allowing the rotary shaft 110 of the turning tool 100 to pass through, thus being engaged to one side of the turning tool, and the support member 220 is formed at the other side of the engaging member 210.

The varying part 300 has one side engaged to the support member 220 in a withdrawing-possible way, with the rotary shaft 310 to which an exchangeable work member is coupled, being formed at its other side.

The driving pulley 400 is disposed at the top of the body part 200 and is coupled to the rotary shaft 110 of the turning tool 100, and the driven pulley 500 is coupled to the rotary shaft 310 of the varying part 300.

The belt 600 for rotating the driven pulley 500 during the operation of the rotary shaft 110 protruded from the turning tool 100 is connected between the driven pulley 500, the driving pulley 400 and the driven pulley 500.

The description of the above construction of the multi-device will be omitted to avoid repeated descriptions.

The embodiments described above in the specifications and accompanying drawings are just provided for illustrative purposes on part of the technical concepts contained in the present invention.

Therefore, the embodiments disclosed in the specifications are to explain, not to limit the technical concepts of the present invention, so it is obvious that the scopes of the technical concepts of the present invention are not limited by the disclosed embodiments of the present invention. Various amendments and examples of the specific embodiments that an ordinary person in the art within the scopes of the technical concepts contained in the specification and the drawings of the present invention can easily assume are included in the scopes of the rights of the present invention.

The invention claimed is:

1. An adjustable length adaptor coupled to a turning tool which is formed of a built-in driving motor hi its interior and from which a rotary shaft rotating during a driving of the driving motor is protrude from its one side, comprising:

a body part which has, at its one side, a through hole allowing a rotary shaft of the turning tool to pass through, and further has an engaging member coupled to one side of the turning tool and a support member formed at the other side of the engaging member;

a varying part which has one side withdrawably coupled to the support member, with a rotary shaft to which an exchangeable work member is coupled, being formed at its other side;

a driving pulley which is disposed on a top of the body part and is coupled to the rotary shaft of the turning tool;

a driven pulley which is coupled to the rotary shaft of the varying part; and a belt which is connected between the driving pulley and the driven pulley and rotates the driven pulley during the rotation of the rotary shaft protruded from the turning tool, wherein either the driving pulley or the driven pulley comprises:

a circular plate-shaped hub which is coupled to the rotary shaft of the driving pulley or the rotary shaft of the driven pulley and has an engaging shaft at its upper surface;

a first belt contact member which is coupled to an upper surface of the hub at an interval;

a second belt contact member which is installed at an interval from the engaging shaft and is slidably disposed between the engaging shaft and the first belt contact member;

an elastic member which is engaged between the second belt contact member and the hub;

a ring shaped cover member which is coupled to an upper side of the first belt contact member; and a tensional force adjusting member which is coupled to the engaging shaft and pressurizes the second belt contact member, so the interval between the engaging shaft and the second belt contact member can vary depending on the position of the tensional force adjusting member coupled to the engaging shaft.

2. An adjustable length adaptor according to claim 1, wherein an insertion channel is formed in a concave shape at one side of the support member, and an insertion rod is formed at one side of the support member in a shape corresponding to the shape of the insertion channel and is withdrawably coupled to the insertion channel.

3. An adjustable length adaptor according to claim 2, wherein an engaging hole communicating with the insertion channel is formed at the support member for a fixture to be engaged, and a plurality of engaging grooves into which the ends of the fixture coupled to the engaging holes are inserted, are formed at one side surface of the insertion rod.

4. An adjustable length adaptor according to claim 3, wherein said insertion channel and said engaging hole formed at the support member are provided in multiple numbers.

5. An adjustable length adaptor according to claim 4, wherein a safety cover is formed at one side of the engaging member, thus allowing the belt coupled to the driving pulley not to be exposed to an outside.

6. An adjustable length adaptor according to claim 1, wherein a protection cover is detachably installed at one side of the varying part to prevent a work piece's flying during the rotation of the exchangeable work member.

7. An adjustable length adaptor according to claim 6, wherein a handle coupled to a second handle engaging member is installed in parallel with the rotary shaft of the varying part.

8. An adjustable length adaptor according to claim 1, wherein a first handle engaging member is formed at one side of the engaging member, and a second handle engaging member is formed at one side of the support member, thus allowing a handle to be selectively engaged to the first handle engaging member or the second handle engaging member.

9. An adjustable length adaptor according to claim 1, wherein a safety cover is formed at one side of the engaging member, thus allowing the belt coupled to the driving pulley not to be exposed to an outside.

10. An adjustable length adaptor according to claim 1 wherein a protrusion part is formed at a surface coming into contact with the belt of the driving pulley and the driven pulley, thus preventing slipperiness of the belt during the rotation of the driving pulley, and a plurality of protrusions to be inserted into the protrusion part are formed at the belt.

11. An adjustable length adaptor according to claim 1, wherein a longitudinal hole is formed at the hub coming into contact with the second belt contact member, and one side of the elastic member is coupled to a lower, central portion of the hub, and the other side of the elastic member passes through the longitudinal hole and is coupled to a lower side of the second belt contact member, and a protruded guide member to be inserted into the longitudinal hole is formed at a lower side of the second belt contact member.

12. An adjustable length adaptor according to claim 1, wherein said work member is one among a lumber cutter, a stone cutter, a steel cutter, a cleaning brush and a gloss brush.

13. A multi-device with an adjustable length adaptor, comprising:

a turning tool which has a built-in driving motor in its interior, with a rotary shaft rotating during a driving of the driving motor being disposed at one side of the same;

a body part which has, at its one side, a through hole allowing a rotary shaft of the turning tool to pass through, and further has an engaging member coupled to one side of the turning tool and a support member formed at the other side of the engaging member;

a varying part which has one side withdrawably coupled to the support member, with a rotary shaft to which an exchangeable work member is coupled, being formed at its other side;

a driving pulley which is disposed on the top of the body part and is coupled to the rotary shaft of the turning tool;

a driven pulley which is coupled to the rotary shaft of the varying part; and a belt which is connected between the driving pulley and the driven pulley and rotates the driven pulley during the rotation of the rotary shaft protruded from the turning tool, wherein either the driving pulley or the driven pulley comprises:

a circular plate-shaped hub which is coupled to the rotary shaft of the driving pulley or the rotary shaft of the driven pulley and has an engaging shaft at its upper surface;

a first belt contact member which is coupled to an upper surface of the hub at an interval;

a second belt contact member which is installed at an interval from the engaging shaft and is slidably disposed between the engaging shaft and the first belt contact member;

an elastic member which is engaged between the second belt contact member and the hub;

a ring shaped cover member which is coupled to an upper side of the first belt contact member; and a tensional force adjusting member which is coupled to the engaging shaft and pressurizes the second belt contact member, so the interval between the engaging shaft and the second belt contact member can vary depending on the position of the tensional force adjusting member coupled to the engaging shaft.

* * * * *